April 17, 1956     W. H. MOREWOOD     2,742,178
INSTRUMENT CASING
Filed April 24, 1952
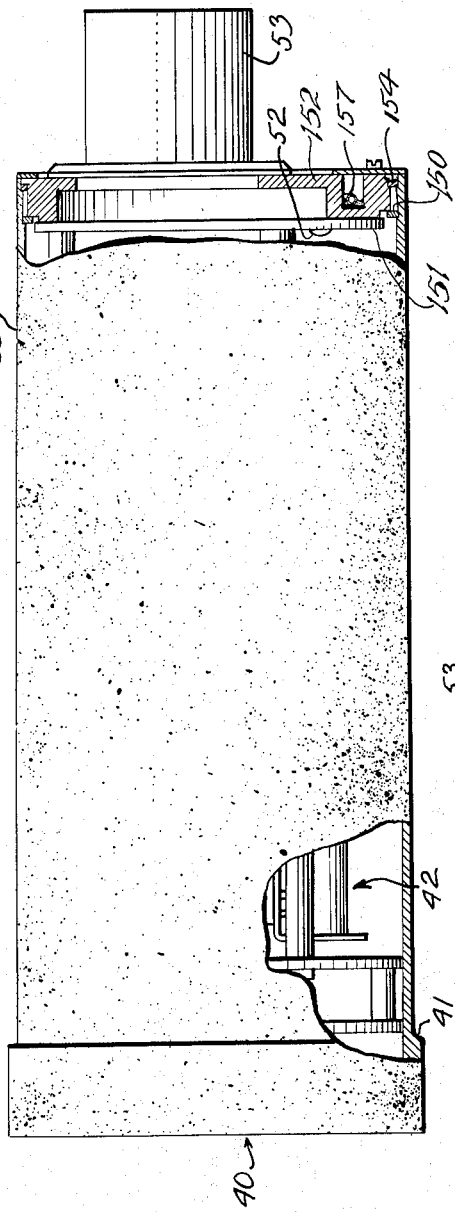
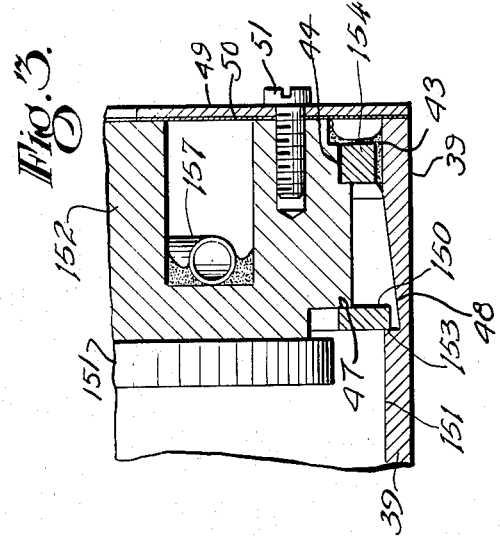
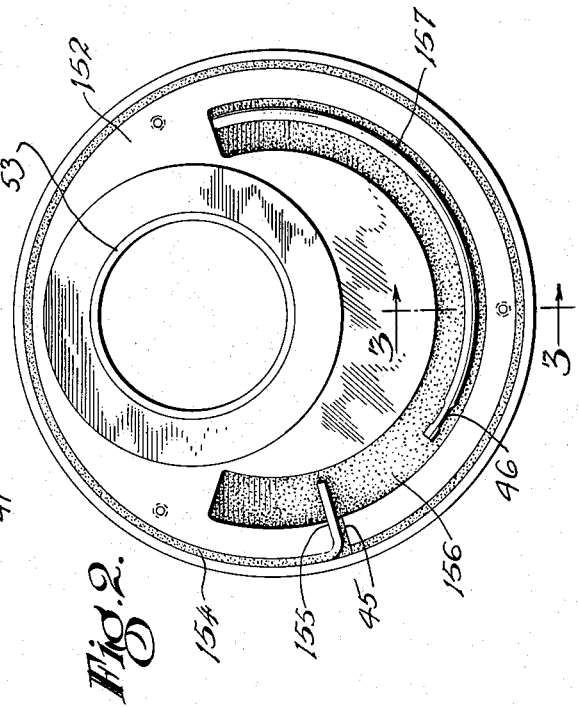
INVENTOR.
WILLIAM H. MOREWOOD
BY Pollard and Johnston
ATTORNEYS United States Patent Office 2,742,178
Patented Apr. 17, 1956

2,742,178

INSTRUMENT CASING

William H. Morewood, Doylestown, Pa., assignor to American Machine and Metals, Inc., Sellersville, Pa., a corporation of Delaware Application April 24, 1952, Serial No. 284,183

1 Claim. (Cl. 220—50)

This invention relates to a closing means and method for instrument casings and particularly to the closing of a hermetically sealed instrument.

In instruments, such as unitary servomechanisms, as described, for example, in copending application Serial Number 284,185, filed April 24, 1952, it is desirable to be able to hermetically seal the same after the parts have been placed in the casing in such a manner that a tight connection is made which can be readily broken. Such is especially true where the servomechanism and amplifier assembly is placed in a relatively small casing as set forth in the aforementioned copending application. It is important that the parts be protected and yet be accessible when necessary.

One of the objects of the invention is to provide an improved instrument casing sealing arrangement which can be broken when it is desired to gain access to the instrument parts.

Another of the objects is to provide an improved method of sealing a back closing plate to an instrument case.

In a preferred aspect, the casing can be arranged to receive the various parts as a unit. A positioning means may be employed, but not necessarily, to limit the distance that the assembly can be inserted into the casing and thus locate it therein. This may take the form of a split compressible ring cooperating with a groove in the casing walls and a shoulder on the back-plate. The instrument casing can be one of suitable shape, such as circular, with the usual window at one end, and with the other end having an open mouth to receive an assembled instrument insert. A mounting plate can be fastened to the back-plate, the mounting plate serving as a support for the various instrument parts.

Prior to assembly, the metallic instrument casing can have a restricted tinned ring or annulus portion interiorly placed adjacent the open mouth thereof. The "tinned" portion can be any metal compatible with solder, such as tin or a similar metal, the metal being electroplated or otherwise placed or deposited on the inside of the casing. The extra metal can be removed by turning, or other appropriate operation, to leave a restricted annulus of metal compatible with solder. The back-plate and casing can be dimensioned relative to each other to provide an open annular area for receiving a tear wire. For example, the open area can be located between the outside diameter of the back-plate and the inside diameter of the casing, a tear wire being insertable in said open area and then soldered in place so as to integrally join by solder the back-plate, tear wire and casing. The casing will have solder only in the tinned area thereof. This will make it possible to remove the tear wire and parts without leaving bridges, if the casing is of a metal not compatible with solder. Preferably, an inwardly extending radial slot is provided into which the end of the tear wire can be bent. Where the term "tinned" is used herein, it means metal compatible or readily joinable with solder.

An evacuating or capillary tube can be placed on the back-plate to evacuate the casing and to fill it with an inert gas. The tube is then sealed in a suitable groove in the back-plate.

In order to open the casing, the tear wire can be grasped adjacent the bend near the radial slot and pulled out of the joint between the back-plate and the casing, heat being applied if required.

These and other objects, advantages and features of the invention will become apparent from the following description and drawings which are merely exemplary.

In the drawings:

Fig. 1 is an elevation view of one form of instrument with which the invention can be used.

Fig. 2 is an end view looking from the right of Fig. 1, the cover plate being omitted.

Fig. 3 is an enlarged fragmentary view taken along the line of 3—3 of Fig. 1.

The arrangement will be described particularly in conjunction with the sealing of a casing enclosing a servomechanism and amplifier assembly as described in the aforementioned copending application. It is to be understood, however, that the invention can be applied to other instrument casings.

Casing 39 can be of a suitable metal or material such as aluminum, said casing having the usual transparent window at one end 40 thereof and a suitable flange 41 for mounting purposes. The assembled insert, which in the described arrangement includes the servomechanism and amplifier, is generally indicated at 42, said insert being fastened to mounting plate 151. Mounting plate 151 can be fastened to the back-plate by screws 52.

The casing can have an annulus of a metal compatible with solder placed at the mouth 43 (Fig. 3) of the casing 39, the casing in the preferred aspect being of aluminum or metal not compatible with solder. This can be done by electro-tin plating the interior end of the casing and then cutting away the excess, leaving only an annulus approximately the width of the tear ring. The parts then can be assembled by inserting them into the casing. The back-plate 152 is dimensioned relative to the casing so as to provide an area or annulus between wall 44 thereof and the interior wall of the casing 39.

The tear wire 154 preferably may be square and of a diameter or dimension such that it can be inserted into the space between surface 44 and the tinned surface 43. The wire ring may, for example, be made of stainless steel electro-tin plated and then tin dipped so as to insure that it will be properly wet by the solder. Preferably the tin is removed from the surfaces adjacent 44 on the back plate and the ring, as well as the surfaces adjacent the step in the back-plate which locates the ring.

As can be seen in Fig. 2, the wire 154 is bent into the space for it and then end 155 is bent into the radial slot 45 in the back-plate.

The wire then can be tacked in place by using suitable solder with as little heat as possible so as to prevent the solder from running into the casing. Thereafter, the ring can be completely soldered in place. Preferably, this can be accomplished by turning the instrument so that it makes an angle with the horizontal, the front end 40 being raised relative thereto so that as the hot solder iron is held at the lower point of the solder joint, and the casing rotated, the solder will flow into the joint and will not flow into the casing. Because the extra tin plating has been machined off, there will be no tendency for the solder to bridge the gap beneath the wire and between the walls of the casing and the back-plate. When such occurs, the solder will remain in place after the wire is pulled out, which will make it difficult to disassemble the instrument.

When it is desired to break the seal, it is merely necessary to grasp the end 155 of the wire and apply heat to the sharp bend therein and pull it out, thereby shearing the solder.

An evacuating or capillary tube 157 can be provided for the purpose of evacuating the casing and/or placing an inert gas therein. After this has been accomplished, the tube is sealed at 46 and, if desired, groove 156 can be suitably filled with solder.

In order to prevent the back-plate from pushing the insert too far into the casing, an expansible and split compressible ring 150 can be provided, the inner surface of which is engaged by shoulder 47 of the back-plate and the outer portion is engaged by shoulder 153 formed by tapered groove 48 in the wall of the casing.

When the back-plate is inserted into the end of the casing, the positioning ring 150 will be compressed so that it will slide into mouth 43, the ring then expanding as it passes into the groove 48 until shoulder 153 is reached. When it is desired to disassemble the instrument, the ring again will be compressed as the insert is pulled out of the casing.

It should be apparent that details of the invention can be varied without departing from the spirit of the invention except as defined in the appended claim.

I claim:

In an instrument casing, the combination comprising a back-plate means having a slot therein for receiving the end of a tear wire, said back-plate means carrying an instrument assembly, a casing having a positively restricted annulus of metal compatible with solder, a tear wire between said annulus and back-plate, said back-plate means being spaced from said casing adjacent said restricted annulus, one end of said tear wire being turned into said slot, solder integrally joining and sealing said back-plate, tear wire and casing, solder in said slot engaging the turned-in end of said wire, and a collapsible ring normally expansible into a groove in said casing limiting movement of said back-plate inwardly into said casing and yieldable for removing the back-plate and inserts carried thereby, said ring and groove positioning said instrument assembly relative to the end of the casing opposite to its open end.

References Cited in the file of this patent

UNITED STATES PATENTS

| | | |
|---|---|---|
| 297,738 | Allen | Apr. 29, 1884 |
| 811,894 | Alden | Feb. 6, 1906 |
| 1,387,426 | Merritt | Aug. 9, 1921 |
| 2,007,584 | Peckham | July 9, 1935 |
| 2,300,259 | Kueppers | Oct. 27, 1942 |
| 2,513,365 | Rogoff | July 4, 1950 |
| 2,546,921 | Dunneback | Mar. 27, 1951 |

FOREIGN PATENTS

| | | |
|---|---|---|
| 20,895 | Australia | Jan. 11, 1935 |